US008797631B2

(12) United States Patent
Duncan et al.

(10) Patent No.: US 8,797,631 B2
(45) Date of Patent: Aug. 5, 2014

(54) PHOTONIC MODULATION OF A PHOTONIC BAND GAP

(71) Applicant: Searete LLC, Bellevue, WA (US)

(72) Inventors: William D. Duncan, Kirkland, WA (US); Roderick A. Hyde, Redmond, WA (US); Nathan P. Myhrvold, Medina, WA (US); Clarence T. Tegreene, Mercer Island, WA (US); Thomas A. Weaver, San Mateo, CA (US); Lowell J. Wood, Jr., Bellevue, WA (US)

(73) Assignee: The Invention Science Fund I LLC

( * ) Notice: Subject to any disclaimer, the term of this patent is extended or adjusted under 35 U.S.C. 154(b) by 0 days.

(21) Appl. No.: 13/904,920

(22) Filed: May 29, 2013

(65) Prior Publication Data

US 2013/0265630 A1    Oct. 10, 2013

Related U.S. Application Data

(63) Continuation of application No. 12/924,140, filed on Sep. 20, 2010, now Pat. No. 8,477,402.

(51) Int. Cl.
*G02B 26/08* (2006.01)

(52) U.S. Cl.
USPC .......................................................... 359/291

(58) Field of Classification Search
USPC ......... 359/245, 247, 288, 290, 291, 285, 305, 359/307, 313, 314, 331, 332
See application file for complete search history.

(56) References Cited

U.S. PATENT DOCUMENTS

| | | |
|---|---|---|
| 5,688,318 A | 11/1997 | Milstein et al. |
| 6,542,682 B2 | 4/2003 | Cotteverte et al. |
| 6,589,334 B2 | 7/2003 | John et al. |
| 6,674,949 B2 | 1/2004 | Allan et al. |
| 6,687,447 B2 | 2/2004 | Flory et al. |
| 6,721,476 B2 | 4/2004 | Padmanabhan et al. |
| 6,809,856 B2 | 10/2004 | Reed et al. |
| 6,859,304 B2 | 2/2005 | Miller et al. |
| 6,917,431 B2 | 7/2005 | Soljacic et al. |
| 6,952,504 B2 | 10/2005 | Bi et al. |
| 6,961,501 B2 | 11/2005 | Matsuura et al. |
| 7,045,195 B2 | 5/2006 | Ozin et al. |
| 7,068,904 B2 | 6/2006 | Itsuji et al. |
| 7,092,606 B2 | 8/2006 | Wong et al. |
| 7,106,918 B2 | 9/2006 | Bita et al. |
| 7,142,364 B2 | 11/2006 | Suh et al. |
| 7,158,711 B2 | 1/2007 | Tokushima |
| 7,173,949 B2 | 2/2007 | Cook |
| 7,181,120 B2 | 2/2007 | Sugitatsu et al. |
| 7,257,333 B2 | 8/2007 | Rosenwald et al. |
| 7,283,716 B2 | 10/2007 | Park et al. |
| 7,289,709 B2 | 10/2007 | Folkenberg et al. |
| 7,299,312 B2 | 11/2007 | McKeown |
| 7,301,977 B2 | 11/2007 | Fischer et al. |
| 7,313,307 B2 | 12/2007 | Ikemoto et al. |
| 7,313,397 B2 | 12/2007 | Ormson et al. |
| 7,351,601 B2 | 4/2008 | Scherer |
| 7,356,218 B2 | 4/2008 | Kato et al. |
| 7,403,690 B2 | 7/2008 | Hyde et al. |
| 7,428,362 B2 | 9/2008 | Hyde et al. |

(Continued)

*Primary Examiner* — Joseph P Martinez

(57) ABSTRACT

An apparatus comprises a first photonic crystal structure having a first photonic band gap distribution and configured to support a first electromagnetic signal, wherein the first photonic band gap distribution may vary according to a second electromagnetic signal.

20 Claims, 13 Drawing Sheets

(56) References Cited

U.S. PATENT DOCUMENTS

| | | |
|---|---|---|
| 7,474,823 B2 * | 1/2009 | Wang et al. .................. 385/37 |
| 7,480,319 B2 | 1/2009 | Scherer |
| 7,480,424 B2 | 1/2009 | Wang |
| 2003/0056546 A1 | 3/2003 | Claus et al. |
| 2004/0061928 A1 | 4/2004 | Stewart |
| 2004/0120670 A1 | 6/2004 | Lidorikis et al. |
| 2004/0170357 A1 | 9/2004 | Takiguchi et al. |
| 2005/0191774 A1 | 9/2005 | Li et al. |
| 2006/0054780 A1 | 3/2006 | Garrood et al. |
| 2006/0198576 A1 | 9/2006 | Furusawa et al. |
| 2006/0285114 A1 | 12/2006 | Cao et al. |
| 2007/0217730 A1 | 9/2007 | Hyde et al. |
| 2008/0030837 A1 | 2/2008 | Ashrit et al. |
| 2008/0230752 A1 | 9/2008 | Bower et al. |
| 2009/0003397 A1 | 1/2009 | Sugitatsu et al. |
| 2009/0030451 A1 | 1/2009 | Hadba et al. |
| 2009/0034051 A1 | 2/2009 | Arsenault et al. |

* cited by examiner

PHOTONIC MODULATION OF A PHOTONIC BAND GAP

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation of U.S. patent application Ser. No. 12/924,140, entitled PHOTONIC MODULATION OF A PHOTONIC BAND GAP, naming WILLIAM DAVID DUNCAN, RODERICK A. HYDE, NATHAN P. MYHRVOLD, CLARENCE T. TEGREENE, THOMAS ALLAN WEAVER, and LOWELL L. WOOD, JR. as inventors, filed 20 Sep. 2010 , which is currently co-pending or is an application of which a currently co-pending application is entitled to the benefit of the filing date.

RELATED APPLICATIONS

None.

SUMMARY

In one embodiment, an apparatus comprises a first photonic crystal structure having a first photonic band gap distribution and configured to support a first electromagnetic signal, the first photonic crystal structure including a first thermally responsive material configured to vary dimensionally in response to a second electromagnetic signal different from the first electromagnetic signal. In this embodiment the first photonic band gap distribution is configured to vary correspondingly to the dimensional variation of the first thermally responsive material.

In another embodiment, an apparatus comprises a first photonic crystal structure having a first photonic band gap distribution and configured to support a first electromagnetic signal, the first photonic crystal structure including a first mechanically movable element. The apparatus further comprises a first converter configured to receive a second electromagnetic signal different from the first electromagnetic signal and output a first electrical signal corresponding to the second electromagnetic signal. In this embodiment, the first mechanically movable element is responsive to the first electrical signal to change the first photonic band gap distribution.

In another embodiment, an apparatus comprises a first photonic crystal structure having a first photonic band gap distribution and configured to support a first electromagnetic signal. The apparatus further comprises a first converter configured to receive a second electromagnetic signal, different from the first electromagnetic signal, and output a first acoustic signal corresponding to the second electromagnetic signal. In this embodiment, the first photonic band gap distribution is configured to change corresponding to the first acoustic signal.

In another embodiment, a method comprises propagating a first electromagnetic signal in a first region having a first photonic band gap distribution, heating at least a first portion of the first region with a second electromagnetic signal, different from the first electromagnetic signal, wherein heating at least a first portion of the first region changes the first photonic band gap distribution, and adjusting the propagation of the first electromagnetic signal responsive to the change in the first photonic band gap distribution.

In another embodiment, a method comprises propagating a first electromagnetic signal in a first region having a first photonic band gap distribution, converting a second electromagnetic signal, different from the first electromagnetic signal, to a first electrical signal, moving at least a first portion of the first region with the first electrical signal, wherein moving at least a first portion of the first region changes the first photonic band gap distribution, and adjusting the propagation of the first electromagnetic signal responsive to the change in the first photonic band gap distribution.

In another embodiment, a method comprises propagating a first electromagnetic signal in a first region having a first photonic band gap distribution, converting a second electromagnetic signal, different from the first electromagnetic signal, to a first acoustic signal selected to change the first photonic band gap distribution, and adjusting the propagation of the first electromagnetic signal responsive to the change in the first photonic band gap distribution.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
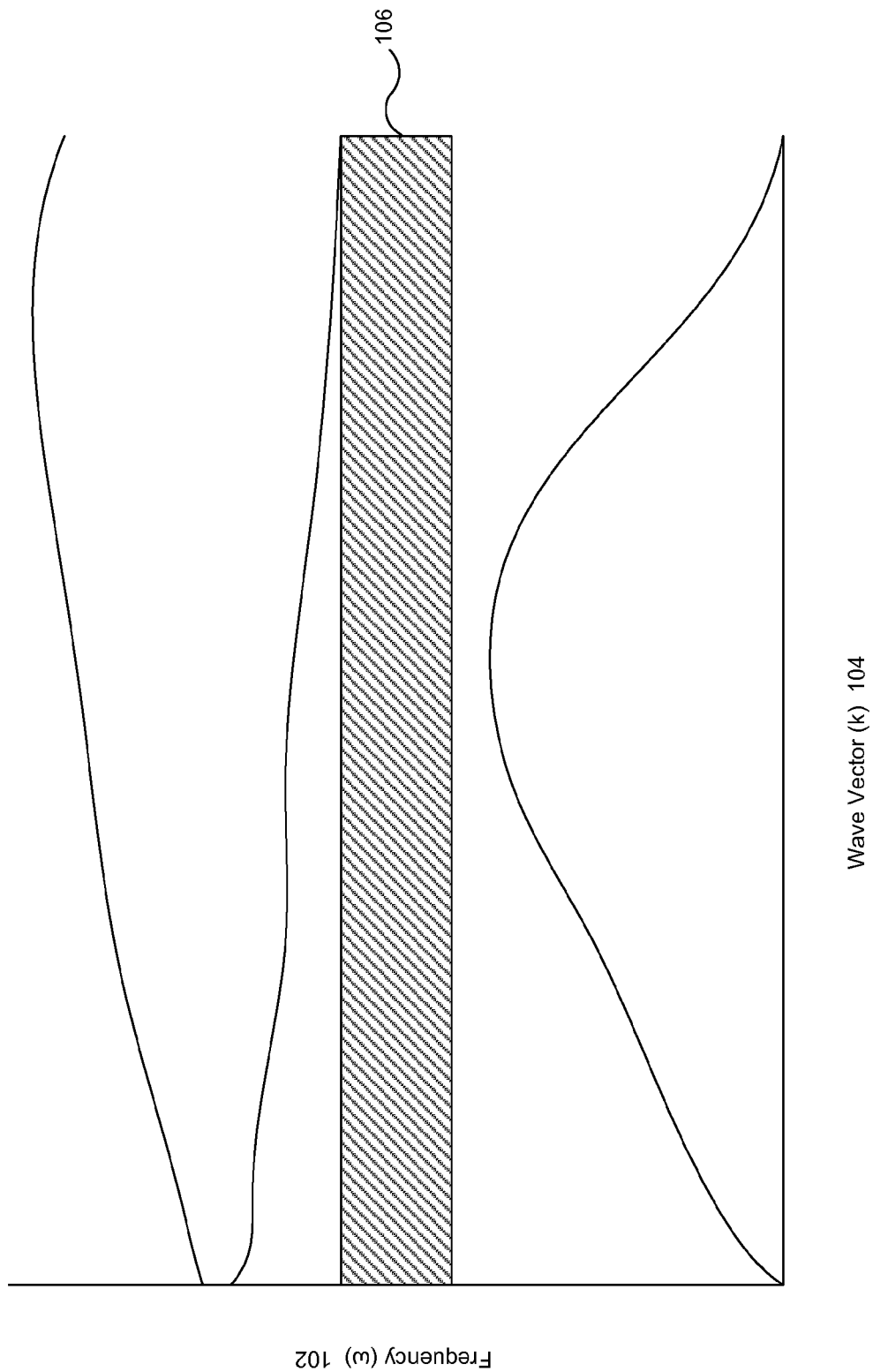
FIG. 1 is a diagram showing the band-gap structure of a typical photonic band-gap material.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In a material having a photonic band gap, electromagnetic energy in a certain range of frequencies does not propagate, so the material transmits a range of frequencies (pass-band) while prohibiting other frequencies. FIG. 1 shows a band-gap diagram for a typical photonic band-gap structure. Plotted is frequency ω 102 versus wave vector k 104. For this structure there is a photonic band-gap 106 and in this range of frequencies radiation does not propagate. Light in frequency ranges above and below the band-gap 106 propagates within the photonic crystal. Generally, photonic crystals may have more than one band-gap and pass-band.

Figure 2:
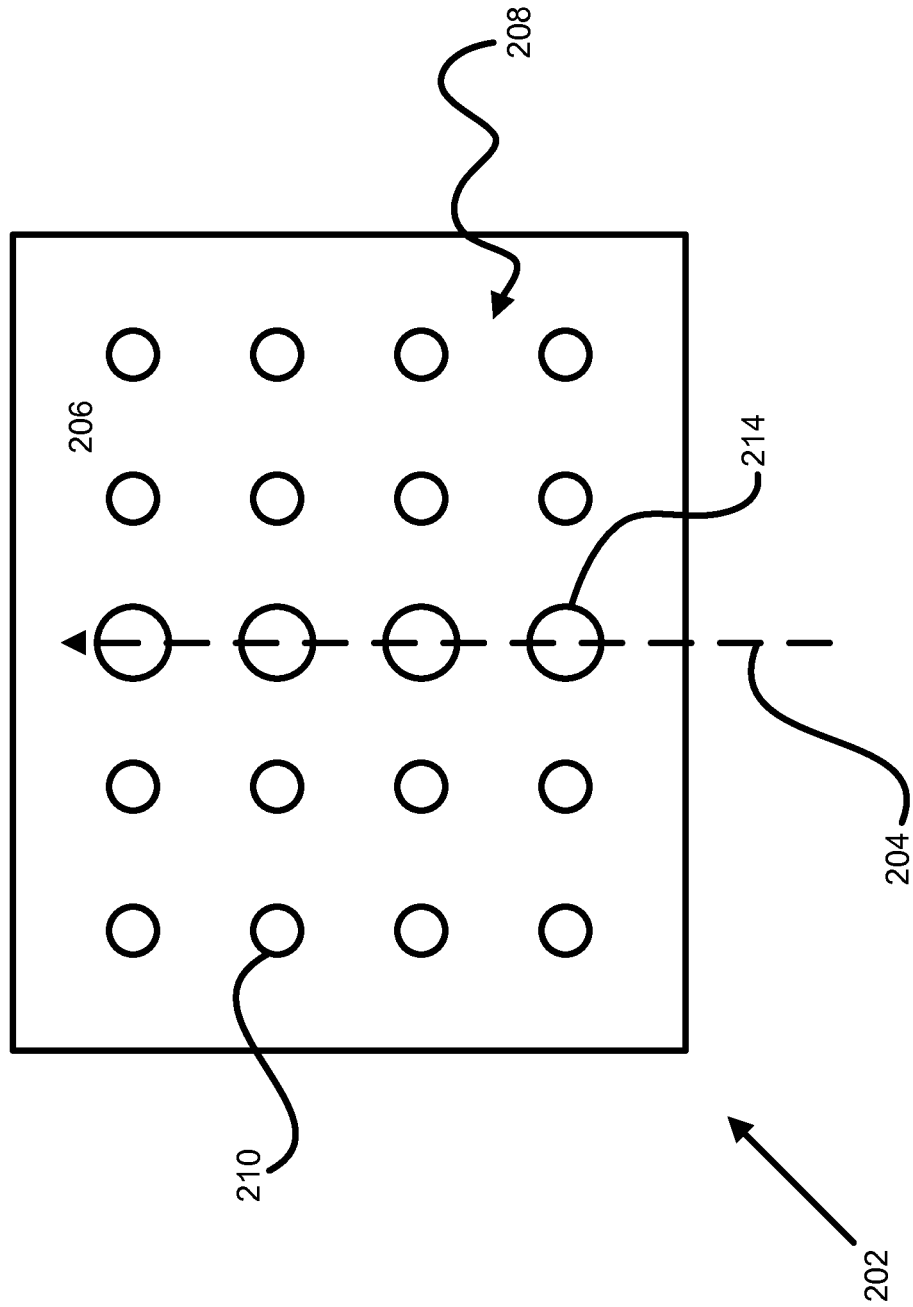
FIG. 2 is an illustration of an apparatus comprising a first photonic crystal structure.

FIG. 2 is an illustration of an embodiment of an apparatus comprising a first photonic crystal structure 202 having a first photonic band gap distribution and configured to support a first electromagnetic signal 204, the first photonic crystal structure 202 including a first thermally responsive material 206 configured to vary dimensionally in response to a second electromagnetic signal 208 different from the first electromagnetic signal 204, and wherein the first photonic band gap distribution is configured to vary corresponding to the dimensional variation of the first thermally responsive material 206. The first thermally responsive material 206 may, in this embodiment, include a dielectric having a relatively high coefficient of thermal expansion such as acrylic or nylon. However, a relatively high coefficient of thermal expansion is not necessary, and the thermally responsive material 206 may be a different type of material having a coefficient of thermal expansion that is appropriate for a particular configuration. Although the embodiment of FIG. 2 may include a dielectric, other embodiments may include a photonic crystal structure 202 that includes a thermally responsive material 206 that is not a dielectric. For example, some embodiments of a photonic crystal structure 202 may include a metal substrate with elements forming a photonic crystal on the substrate, wherein the properties of the photonic crystal may vary according to the change in shape of the metal substrate. In some embodiments, the thermally responsive material 206 may include a shape memory alloy. There are many ways of configuring a photonic crystal structure such as 202 such that it is thermally responsive, and one skilled in the art may select a material configured to change shape and/or size in response to temperature and configure it in such a way that it forms a photonic crystal whose properties chance upon receipt of electromagnetic energy.

Figure 3:
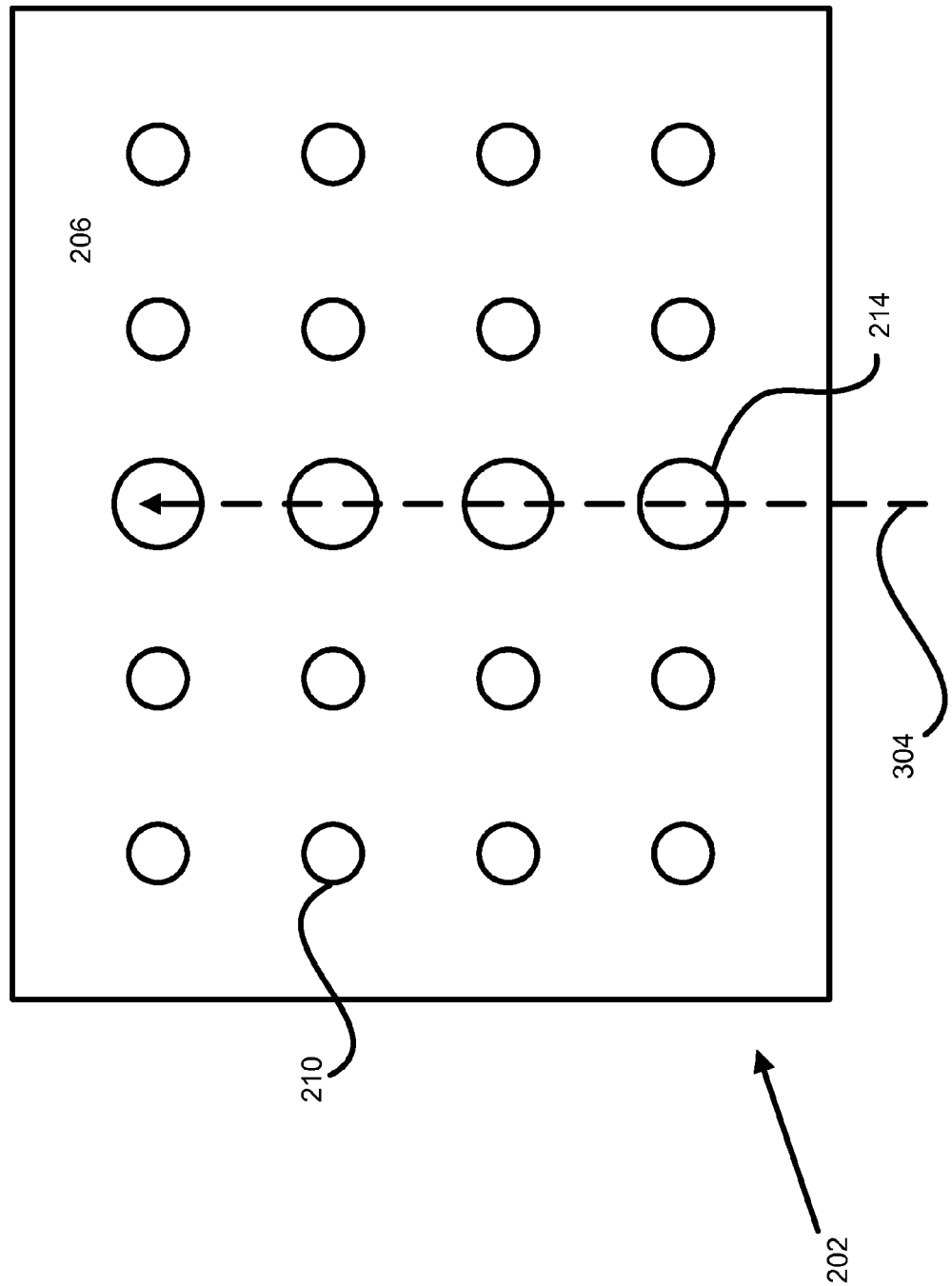
FIG. 3 is an illustration of an apparatus comprising a first photonic crystal structure.

FIG. 3 shows the first photonic crystal structure 202 after the first thermally responsive material 206 has varied dimensionally in response to the second electromagnetic signal 208. In the embodiment of FIGS. 2 and 3, the first photonic crystal structure 202 is a substantially two-dimensional photonic crystal, wherein the first photonic crystal structure 202 includes a first thermally responsive material 206 with substantially cylindrical voids 210, 214, wherein the voids 210, 214 comprise air.

FIG. 3 shows the first photonic crystal structure 202 after the variation of the first thermally responsive material 206. The first photonic crystal structure 202 shown in its initial state in FIG. 2 supports a first electromagnetic signal 204, the first electromagnetic signal 204 having a first frequency distribution. The first photonic crystal structure 202 shown in its final state in FIG. 3 supports a third electromagnetic signal 304, the third electromagnetic signal 304 having a third frequency distribution different from the first frequency distribution.

In one embodiment the first photonic crystal structure 202 further includes a second thermally responsive material, different from the first thermally responsive material 206 and configured to vary dimensionally in response to a third electromagnetic signal different from the first and second electromagnetic signals 204, 208.

In one embodiment, the first photonic band gap distribution may be configured to vary between a first state and a second state, wherein the first state corresponds to a first configuration of the second electromagnetic signal 208 and the second state corresponds to a second configuration of the second electromagnetic signal 208. In this embodiment, the first configuration of the second electromagnetic signal 208 may correspond to a first frequency of the second electromagnetic signal 208 and the second configuration of the second electromagnetic signal may correspond to a second frequency of the second electromagnetic signal 208.

In one embodiment the supported first electromagnetic signal 204 has a first frequency distribution and/or a first field distribution that is configured to vary according to the varying photonic band gap distribution. For example, the band gap of the first photonic crystal structure 202 at least partially determines the frequency of the electromagnetic energy that may propagate through a region, such as the region including the larger cylindrical voids 214). Further, the configuration of the voids, along with the band gap, may determine the modes of electromagnetic energy that may propagate. Changing the configuration of the first photonic crystal structure (thermally, as described with respect to FIGS. 2 and 3, or in another way, some of which will be described in this application) 202 may change the frequency of electromagnetic energy and/or the modes that may propagate in the first photonic crystal structure 202 in a region such as that which includes the larger cylindrical voids 214 in FIGS. 2 and 3.

In one embodiment the first thermally responsive material 206 is further configured to vary dimensionally in response to a third electromagnetic signal (not shown) different from the first and second electromagnetic signals 204, 208. For example, the third electromagnetic signal may be tuned to a different frequency than the second electromagnetic signal 208, or it may be tuned to the same frequency as the second electromagnetic signal 208 and may be configured relative to the first photonic crystal structure 202 to provide an input at a location different from that of the second electromagnetic signal 208. There are many different configurations in which more than one control signal (such as the second electromagnetic signal 208) may be used to control the first thermally responsive material 206, and one skilled in the art may configure one or more of these sources to electromagnetically control the first thermally responsive material 206.

In one embodiment the first electromagnetic signal 204 may have a first frequency distribution and the second electromagnetic signal 208 may have a second frequency distribution different from the first frequency distribution. The first frequency distribution may have a first center frequency and the second frequency distribution may have a second center frequency different from the first center frequency, where the first center frequency may be greater than, substantially equal to, or less than the second center frequency.

In one embodiment the first photonic band gap distribution is configured to change reversibly in response to the second electromagnetic signal 208. In another embodiment the first photonic band gap distribution is configured to change irreversibly in response to the second electromagnetic signal 208, such as in the case where the first thermally responsive material 206 is configured to undergo a phase change in response to the second electromagnetic signal 208.

In the embodiments shown in FIGS. 2 and 3, the region including the larger cylindrical voids 214 forms a substantially waveguiding structure. In some embodiments, the first photonic crystal structure 202 may incorporate other types of guiding structures, including but not limited to optical fibers and/or other types of waveguides.

Although FIGS. 2 and 3 are described such that the first photonic crystal structure 202 includes a first thermally responsive material 206 having an array of cylindrical voids 210, 214, other embodiments may have other configurations. For example, in some embodiments a smaller portion of the first photonic crystal structure 202 may include the thermally responsive material 206. In some embodiments the cylindrical voids 210, 214 may be replaced with a material such as a dielectric, or a second thermally responsive material, not shown. Further, although FIGS. 2 and 3 show cross-sections of a substantially 2D photonic crystal, other embodiments may include a 1D or 3D photonic crystal.

Figure 4:
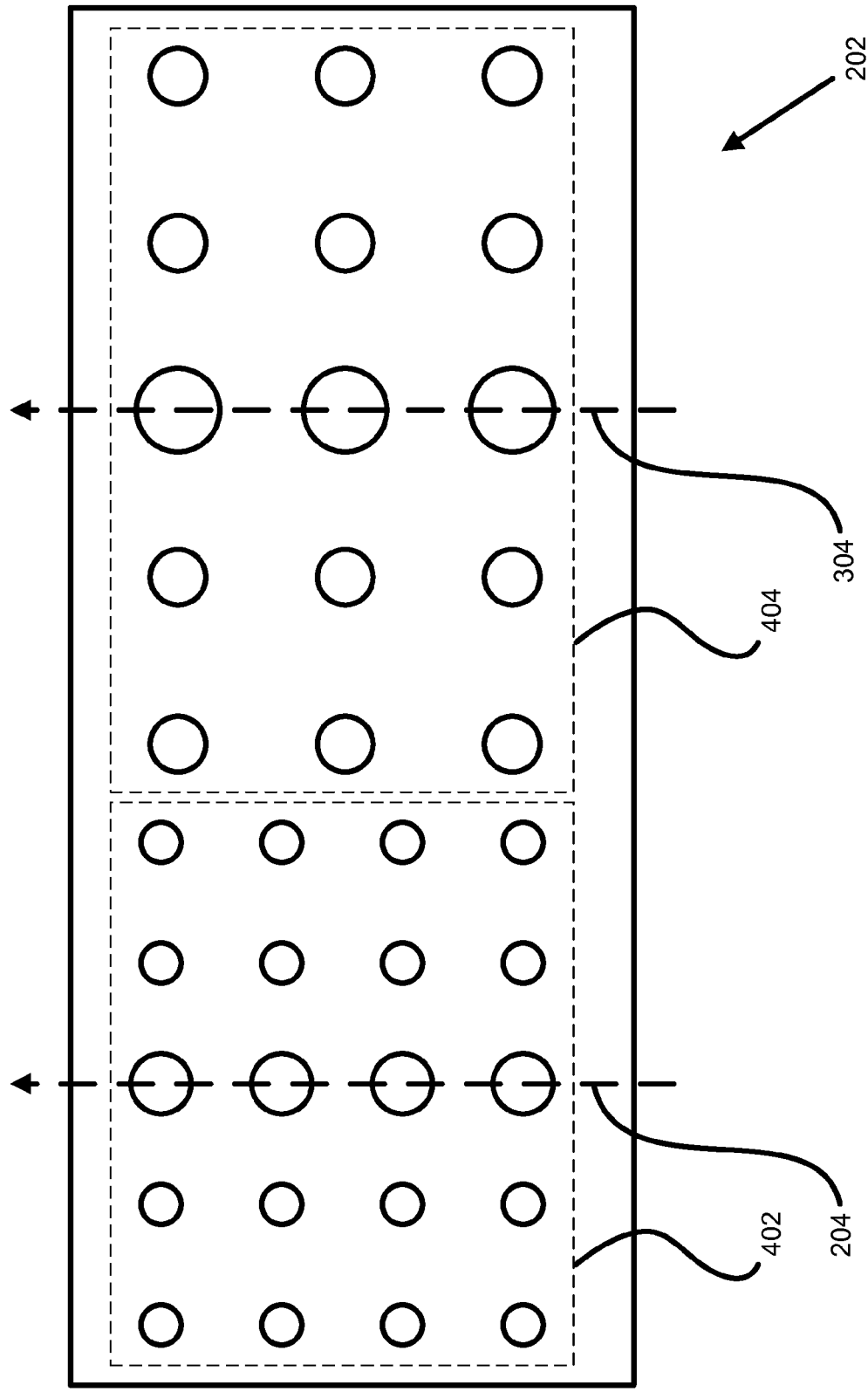
FIG. 4 is an illustration of an apparatus comprising a first photonic crystal structure having two regions.

Although the first photonic band gap distribution is shown as being substantially constant in the region occupied by the smaller voids 210 for a given time, in some embodiments the photonic band gap distribution may have a first band gap in a first region 402, a second band gap different from the first band gap in a second region 404, etc., as shown in FIG. 4. The different band gaps may be selected for purposes of routing different signals having different energies/frequencies, or for a different reason. For example, in the embodiment shown in FIG. 4, the first region 402 is supportive of a first electromagnetic signal 204 having a first frequency distribution and the second region 404 is supportive of a third electromagnetic signal 404 having a third frequency distribution different from the first frequency distribution. The term "photonic band gap distribution" means that the distribution of the photonic band gap in the first photonic crystal structure 202 may vary in space and/or in time.

Although the embodiment shown in FIG. 4 has two distinct regions 402, 404, other embodiments may include more than two regions. Further, although the regions 402, 404 in FIG. 4 are substantially distinct, in some embodiments the photonic band gap may vary gradually such that the photonic band gap varies smoothly as a function of distance across the photonic band gap structure 202.

Although the embodiments shown in FIGS. 2-4 are described such that each region (such as the regions 402, 404) is supportive of one electromagnetic signal (such as the first electromagnetic signal 204 and/or the third electromagnetic signal 406), any of the embodiments described herein may be adapted to include any number of guiding structures formed in the regions 402, 404. Further although the guiding structures are shown as being substantially straight, other embodiments may include guiding structures having bends, curves, Y's, T's, junctions, and/or any type of structure that may guide electromagnetic energy in or on a photonic crystal structure.

Although the embodiments shown in FIGS. 2-4 have substantially square lattices, other embodiments may include a different lattice structure, such as a triangular lattice structure, a hexagonal lattice structure, a Kagome structure, a graphite structure, a woodpile structure, an opal structure, an inverse opal structure, or a Bragg stack, to name some of the possibilities. Generally, the photonic crystal structure may include a periodic dielectric structure, a metallic-dielectric crystal, a semiconductor material, a ceramic material, a magnetic material, an atomic-molecular structure or any other structure configured to produce such effects. While the structures above refer commonly to crystal lattice materials, other types of structures may be formed as photonic materials. For example, photonic structures have been produced by forming a series of holes in a material. In another alternative, a metamaterial-based photonic material is presented in U.S. Pat. No. 6,589,334 to John, et al, entitled Photonic Bandgap Materials Based on Posts in a Lattice. The first photonic crystal structure 202, and any of the photonic crystal structures described herein, may include a 1D, 2D, and/or 3D photonic crystal. The photonic crystal may be formed from a single material, it may be formed from two different materials such as two different dielectrics (i.e., two materials each having a real dielectric constant greater than 1), and/or it may have a different configuration.

Although the second electromagnetic signal 208 is shown in FIG. 2 as being incident on the first photonic crystal structure 202 at a single location and having a certain incident angle for illustrative purposes, there are many different configurations in which the second electromagnetic signal 208 may interact with the first photonic crystal structure 202. For example, in some embodiments the second electromagnetic signal 208 may be produced by one or more lasers, and/or in some embodiments the second electromagnetic signal 208 may be produced by one or more other sources of electromagnetic energy, such as one or more LEDs, antennas, incandescent bulbs, and/or a different source. The second electromagnetic signal 208 may have a variety of spatial and/or frequency distributions, and may be incident on the first photonic crystal structure 202 from a variety of incident angles, wherein the arrangement of the second electromagnetic signal 208 may depend on the particular embodiment.

Figure 5:
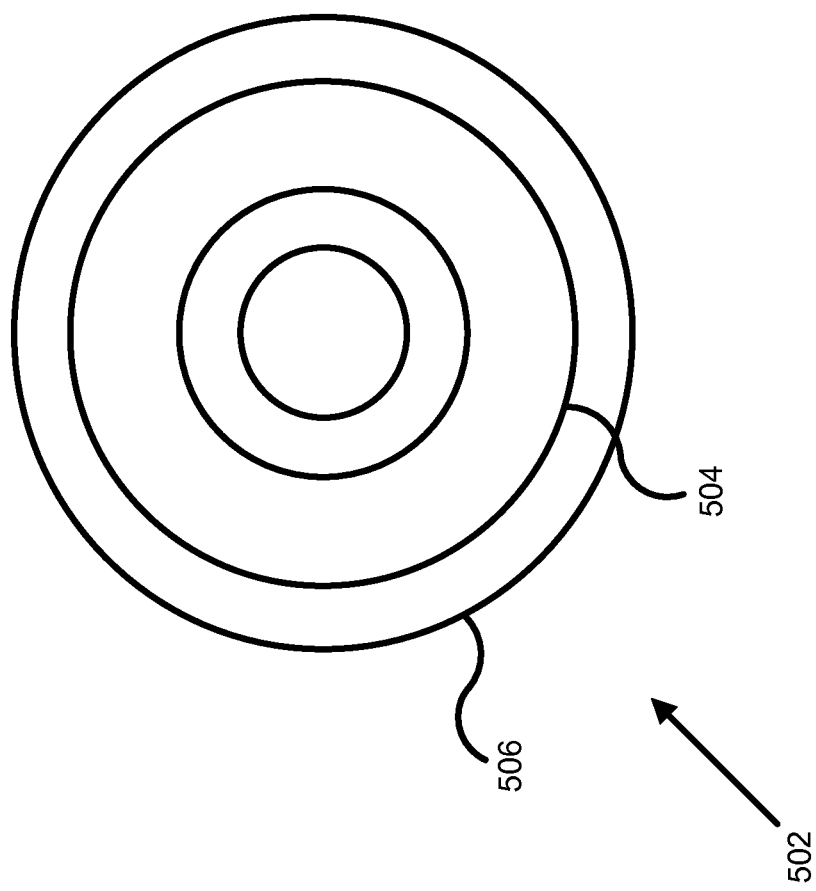
FIG. 5 is an illustration of a photonic crystal fiber.

Although the first photonic crystal structures 202 in FIGS. 2-4 are substantially 2D and have substantially rectilinear geometries, in another embodiment the first photonic crystal structure 202 may form a photonic crystal fiber 502 as shown in FIG. 5, which shows a cross-section of such a fiber having a photonic band gap. In this embodiment the photonic crystal structure may be formed from a series of concentric layers 504, 506. Although the fiber 502 of FIG. 5 shows the concentric layers 504, 506 having a substantially circular geometry, in other embodiments the substantially concentric layers may be rectilinear in cross-section, or the cross-section may have some other shape. Further, although the embodiment described above has concentric layers, in other embodiments the layers may slightly-non-concentric, or the photonic crystal fiber may not have concentric layers 504, 506 but may instead be formed in a different way, such as according to holey fiber approaches. FIG. 5 shows a structure having a core and three outer layers, but in other embodiments other numbers of outer layers may be desirable.

Figure 6:
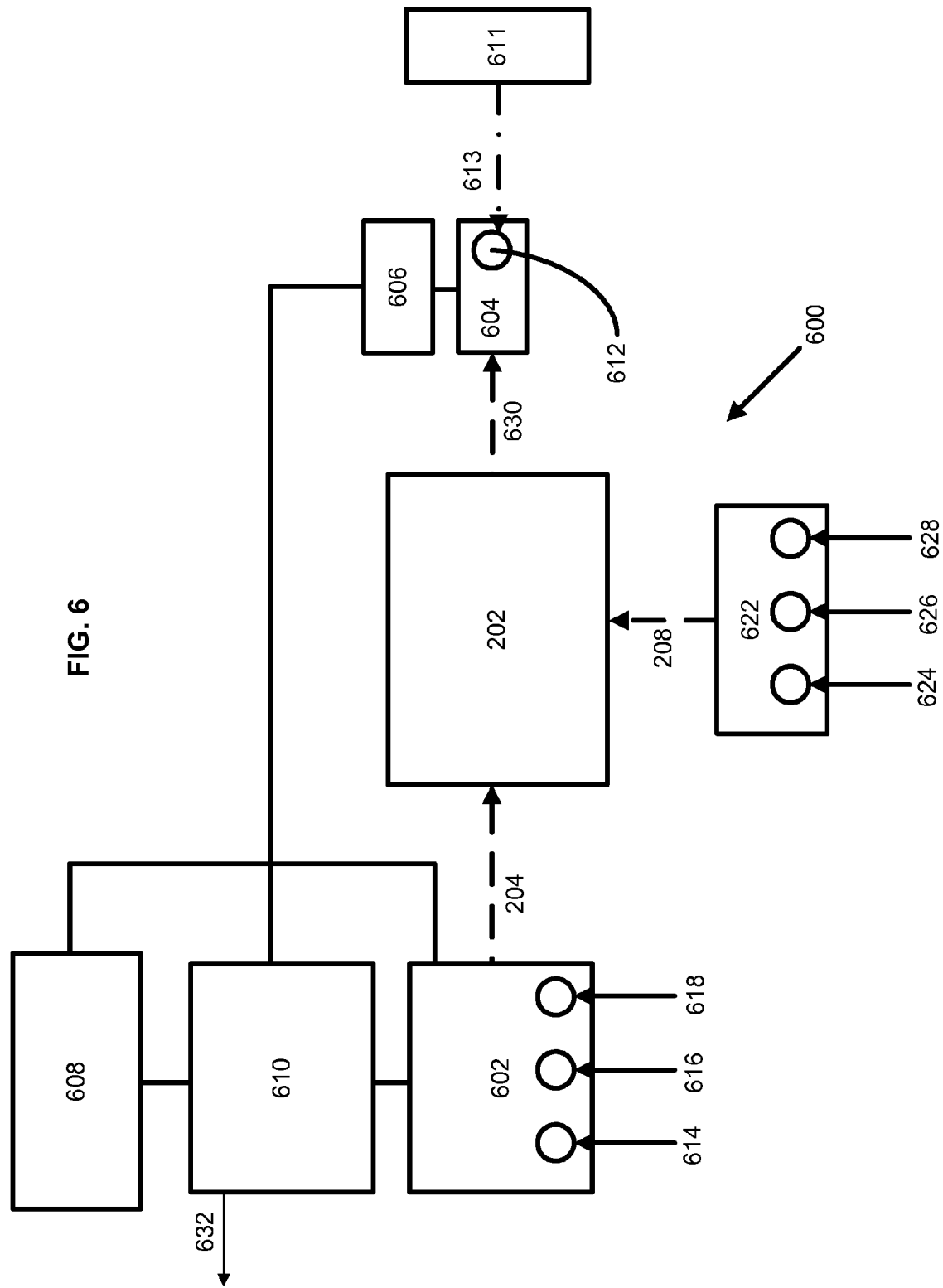
FIG. 6 is an illustration of a system including a first photonic crystal structure.

FIG. 6 shows an embodiment of an apparatus 600 comprising a generator 602 arranged to produce the first electromagnetic signal 204. The generator 602 may include selectors 614, 616, 618, where in this embodiment the selectors include an amplitude range selector 614, a duration selector 616, and an energy range selector 618.

For example, where the generator 602 is configured to output electromagnetic energy in the optical portion of the electromagnetic spectrum, the energy range selector 618 may be configured to select energies substantially in this range. Or, the generator 602 may be configured to output electromagnetic energy in a different portion of the electromagnetic spectrum, and the energy range selector 618 may be configured to select energies substantially in this range. Although energies in the optical portion of the electromagnetic spectrum are described here as exemplary embodiments, in other embodiments the generator 602 may be configured to output electromagnetic energy in a different portion of the spectrum, or in several different portions of the spectrum.

The duration selector 616 may be configured to select a time range for which the generator 602 is on, and/or a time pattern for an on/off cycle of the generator 602 to follow, and/or some other selection of time distribution for the operation of the generator 602. For example, the selector 616 may allow a user to set the generator 602 to be on for two minutes every hour, or for several hours a day, or following some other pattern, which may be periodic, aperiodic, or a combination of both. Many different temporal distributions may be desired and one skilled in the art may adjust the selector 616 to accommodate these distributions.

Although three different selectors 614, 616, 618 are shown, other embodiments may include more, less, or different selectors. In some embodiments the selectors 614, 616, 618 may be knobs allowing for user selection as shown in FIG. 6, or they may be configured to receive an electronic or other signal, or they may be controlled in a different way. For example, the selectors 614, 616, 618 may be computer controlled, and/or they may be responsive to directed signals, including those that might come from the photonic crystal structure 202. Further, the selectors 614, 616, 618 may be responsive to a remote source such as a computer, a routing system, or other source.

FIG. 6 further includes a second generator 622 configured to produce the second electromagnetic signal 208, and selectors including a second amplitude range selector 624, a second duration selector 626, and a second energy range selector 628, where the different embodiments of the second generator 622 and selectors 624, 626 and 628 are as described previously for the generator 602 and selectors 614, 616 and 618.

The apparatus 600 shown in FIG. 6 may further comprise a receiver 604 positioned to receive the energy, where the receiver 604 may be configured to receive electromagnetic energy. The apparatus 600 may further comprise a transmitter 606 arranged to transmit information related to the received energy. The apparatus 600 may further comprise a storage medium 608 arranged to store information related to the received energy, and/or a processor 610 arranged to process information related to the received energy. Although the generators 602 and 622, receiver 604, transmitter 606, storage medium 608, and the processor 610 are shown in FIG. 6 as separate units, in some embodiments some or all of them may be incorporated into a single device. For example, in some embodiments the receiver 604 and the transmitter 606 may be incorporated into a single unit, the storage medium 608 and the processor 610 may be incorporated into a single unit, or there may be other configurations and one skilled in the art will recognize that there are many permutations of the configuration shown in FIG. 6.

The embodiment shown in FIG. 6 shows electromagnetic energy produced by a generator 602, traveling through the first photonic crystal structure 202, and then being received by the receiver 604. However in other embodiments the first photonic crystal structure 202 may include one or more reflectors such that electromagnetic energy remains substantially trapped in the first photonic crystal structure 202. Or, the electromagnetic energy may leave the first photonic crystal structure 202 in a highly dispersed fashion and not in the collimated beam as shown in FIG. 6. The actual path taken by electromagnetic energy incident on the first photonic crystal structure 202 is a function of, for example, the structure, optical elements included, and other properties of the first photonic crystal structure 202, and one skilled in the art may find many variants on FIG. 6.

FIG. 6 further shows an input port 612 arranged to receive a first signal 613 directive of information related to the received energy. The input port 612 is shown in FIG. 6 as a selector where the first signal 613 is a selection made by a user 611, where a user 611 may turn the selector to select, for example, an energy range to receive. The user 611 may be a person, a computer, an outside network, or any other source that may provide input to the input port 612. Although the input port 612 is described as receptive to an energy range selection, in other embodiments the input port 612 may be receptive to a different selection, such as a time duration for receiving energy or another type of selection. Or, there may be more than one input port 612, where the different input ports may be receptive to different signals. Although the input port 612 is described as a selector and the first signal 613 is described as a user selection, in other embodiments the input port 612 and first signal 613 may be a different combination, such as the case where the input port 612 is an electronic port and the input signal is an electronic signal that may be configured to, for example, sweep through a range of frequencies to receive. The input port 612 may have yet a different configuration and the input signal may take a different form, and one skilled in the art may recognize a variety of different ways of inputting information into the input port 612.

FIG. 6 includes a multitude of different devices such as the generators 602 and 622, receiver 604, transmitter 606, storage medium 608, and processor 610. However in some embodiments only one or a few of the devices 602, 622, 604, 606, 608, 610 may be included. For example, one embodiment may include a generator 602 but not other devices such as the receiver 604, or there may be a different combination of devices included. Further, some embodiments may include other devices or components not shown.

In one embodiment the apparatus further comprises a sensor (such as the receiver 604) configured to detect at least one property of the first electromagnetic signal 204, wherein the at least one property of the first electromagnetic signal 204 may correspond to a frequency and/or a field, and wherein the sensor is operably coupled to a device configured to control the second electromagnetic signal 208. For example, the receiver 604 might be operably connected to the second generator 622. Or, the device configured to control the second electromagnetic signal 208 may include an optical element (not shown) configured to interact with the second electromagnetic signal 208, where in this embodiment the optical element may be operably connected to the receiver 604. The sensor may be operably coupled to circuitry which may be further b operably coupled to the device configured to control the second electromagnetic signal 208.

Although FIG. 6 shows the output 630 of the first photonic crystal structure 202 as being incident on the receiver 604, in some embodiments the output 630 of the first photonic crystal structure 202 may be used as an input to the first photonic crystal structure 202. For example, all or part of the output signal 630 may form the second electromagnetic signal 208 and/or may form a different signal input to the first photonic crystal structure 202. The signal may be incident directly on the first photonic crystal structure 202, and/or it may undergo processing before being incident on the first photonic crystal structure 202. In some embodiments, inputting all or a portion of the output signal 630 to the first photonic crystal structure 202 may be used to counteract the effects of the second electromagnetic signal on the first photonic crystal structure 202.

Although FIG. 6 shows a substantially closed system, in some embodiments information from the system may be output to a different location. For example, the output 632 from the processor 610 may be transmitted wirelessly or electronically to a different location, such as a network, a computer, a different photonic crystal structure, or a different location. Although the output 632 is shown as being output from the processor 610 in FIG. 6, any of the elements shown in FIG. 6 may produce an output and/or receive an input from a location and/or source different from that shown in FIG. 6.

In the embodiments shown in FIGS. 2 and 3, the first photonic crystal structure 202 includes a first material having the first photonic band gap distribution, wherein the first thermally responsive material 206 is integral to the first material, i.e., the first thermally responsive material 206 forms at least a part of the first photonic crystal structure 202. In another embodiment, shown in FIG. 7, the first thermally responsive material 206 may be arranged proximate to the first material 702 having the first photonic band gap distribution. In this embodiment, the first thermally responsive material 206 is selected to vary dimensionally in response to a temperature change caused by the second electromagnetic signal 208. However, in this embodiment the first thermally responsive material 206 is configured to expand as it is heated and thereby to apply pressure on the first material 702 having the first photonic band gap distribution in the directions 704, 706 to compress the first material 702 having the first photonic band gap distribution and therefore change the photonic band gap distribution of the first photonic crystal structure. Further, the first thermally responsive material 206 may be configured to compress as it cools and thereby to decrease pressure and/or provide suction or other force on the first material 702 having the first photonic band gap distribution opposite the directions 704, 706 to decompress the first material 702 having the first photonic band gap distribution and therefore change the photonic band gap distribution of the first photonic crystal structure.

Figure 7:
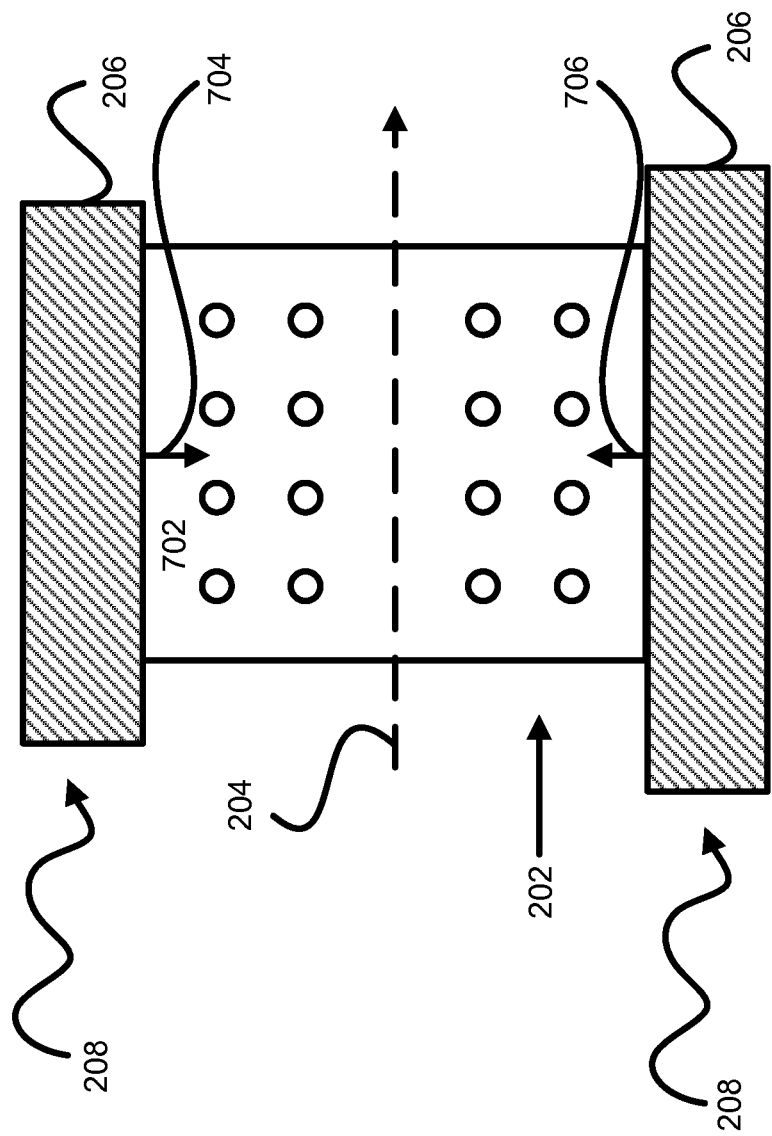
FIG. 7 is an illustration of an apparatus comprising a first photonic crystal structure.

Although FIG. 7 is described above such that the first thermally responsive material 206 is configured to apply and/or release pressure on the first material 702 having the first photonic band gap distribution, in other embodiments a different type of material or configuration may apply pressure to the first material 702 having the first photonic band gap distribution in response to the second electromagnetic signal 208. For example, as will be described with respect to FIG. 9, a first converter 904 may be configured to receive the second electromagnetic signal 208 and output a first electrical signal corresponding to the second electromagnetic signal 208, and a first mechanically movable element 902 may be responsive to the first electrical signal to move, thereby applying pressure to the first material 702 having the first photonic band gap distribution in the directions 704, 706 and changing the first photonic band gap distribution. Similarly, The mechanically movable element 902 may be responsive to the first electrical signal to move thereby releasing pressure from the first material 702, thus changing the first photonic band gap distribution.

Although FIG. 7 is described in particular with respect to the embodiments wherein a first thermally responsive material 206 and/or a first mechanically movable element 902 applies pressure to the first material 702 having the first photonic band gap distribution in response to the second electromagnetic signal 208, there may be other configurations in which pressure may be applied to the first material 702 having the first photonic band gap distribution in response to the second electromagnetic signal 208. For example, the second electromagnetic signal 208 may be converted to motional energy in a variety of ways and one skilled in the art may replace the thermally responsive material 206 and/or first mechanically movable element 902 with a different material or configuration arranged to apply pressure to the first material 702 having the first photonic band gap distribution.

Further, although the photonic band gap of the first photonic crystal structure 202 is shown in FIG. 7 as being substantially 2D, wherein pressure is applied in a direction in which the first photonic crystal structure 202 is periodic, in other embodiments the first photonic crystal structure 202 may include a substantially 1D and/or 3D photonic crystal, and/or the pressure may be applied in a different location, and/or the pressure may be applied in any number of locations. For example, in an embodiment where the first photonic crystal structure 202 is a substantially 1D photonic crystal, the photonic crystal may be patterned on a substrate or placed on a mount, not shown, wherein pressure may be applied by a first thermally responsive material 206 and/or a first mechanically movable element 902 to the photonic crystal on the side opposite that of the substrate and/or mount.

Figure 8:
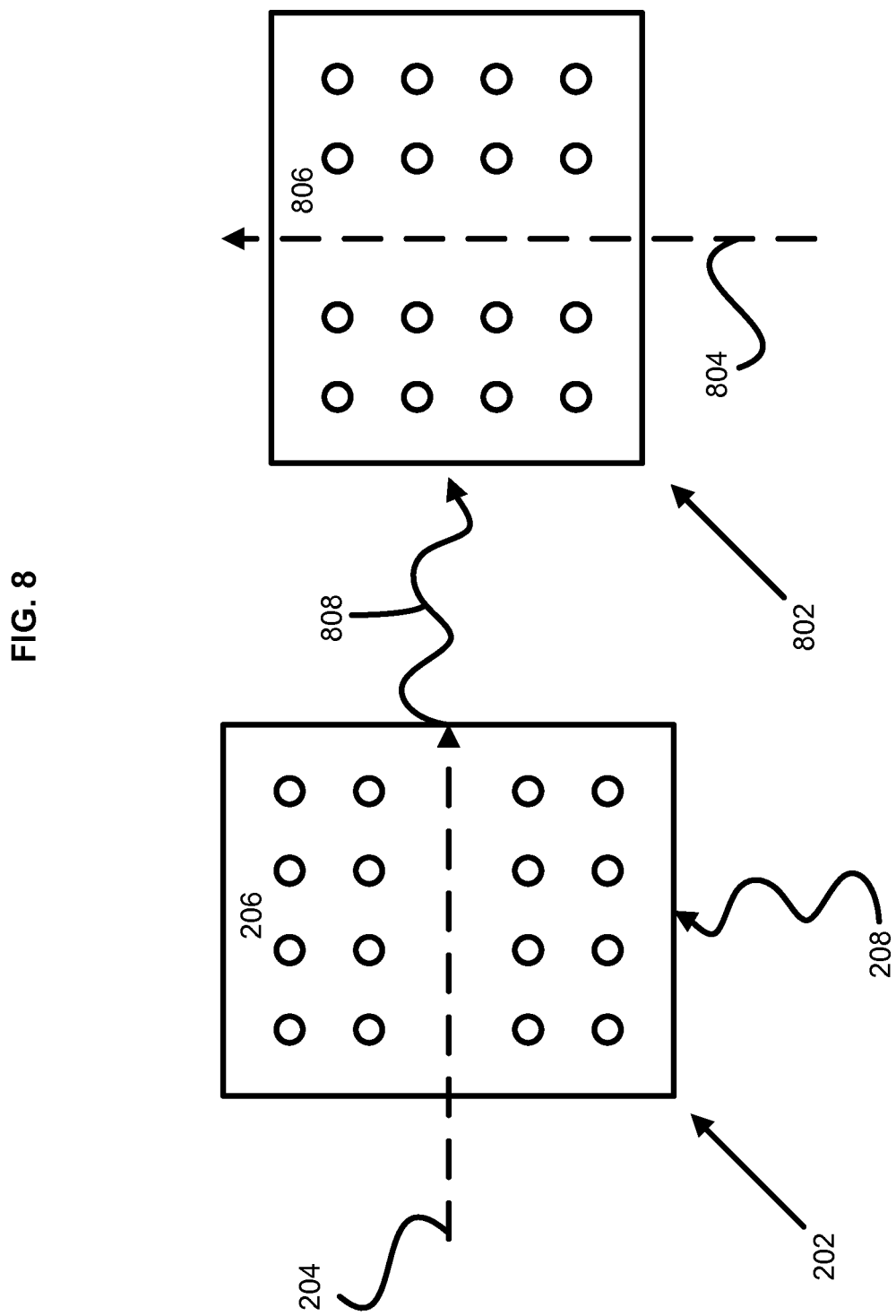
FIG. 8 is an illustration of an apparatus comprising two photonic crystal structures.

In an embodiment shown in FIG. 8, the apparatus may further comprise a second photonic crystal structure 802 having a second photonic band gap distribution and configured to support a third electromagnetic signal 804, the second photonic crystal structure 802 including a second thermally responsive material 806 configured to vary dimensionally in response to a fourth electromagnetic signal 808 different from the third electromagnetic signal 804. In this embodiment, the second photonic band gap distribution is configured to vary corresponding to the dimensional variation of the second thermally responsive material 806, as described previously with respect to FIGS. 2 and 3. In the embodiment of FIG. 8, the output of the first photonic crystal structure 202, corresponding to the first electromagnetic signal 204, forms the fourth electromagnetic signal 808. However, in other embodiments the fourth electromagnetic signal 808 may be something different from the first electromagnetic signal. Further, in some embodiments the output of the first photonic crystal structure 202, corresponding to the first electromagnetic signal 204, may correspond to the third electromagnetic signal 804. There are many ways that two or more photonic crystal structures such as the photonic crystal structures 202 and 802 may be configured to form logic, wherein output from one photonic crystal structure may be input to a second photonic crystal structure, wherein a single input and/or output may be divided and/or routed using one or more optical elements and form the input to more than one photonic crystal structure, or there may be a different permutation. In these embodiments, the second and third electromagnetic signals 208, 804 may be incident directly on thermally responsive materials such as 206 and 806, and/or the second and third electromagnetic signals may be incident on one or more converters such as the converters 904 and 1102, which will be described in further detail with respect to FIGS. 9 and 10.

Figure 9:
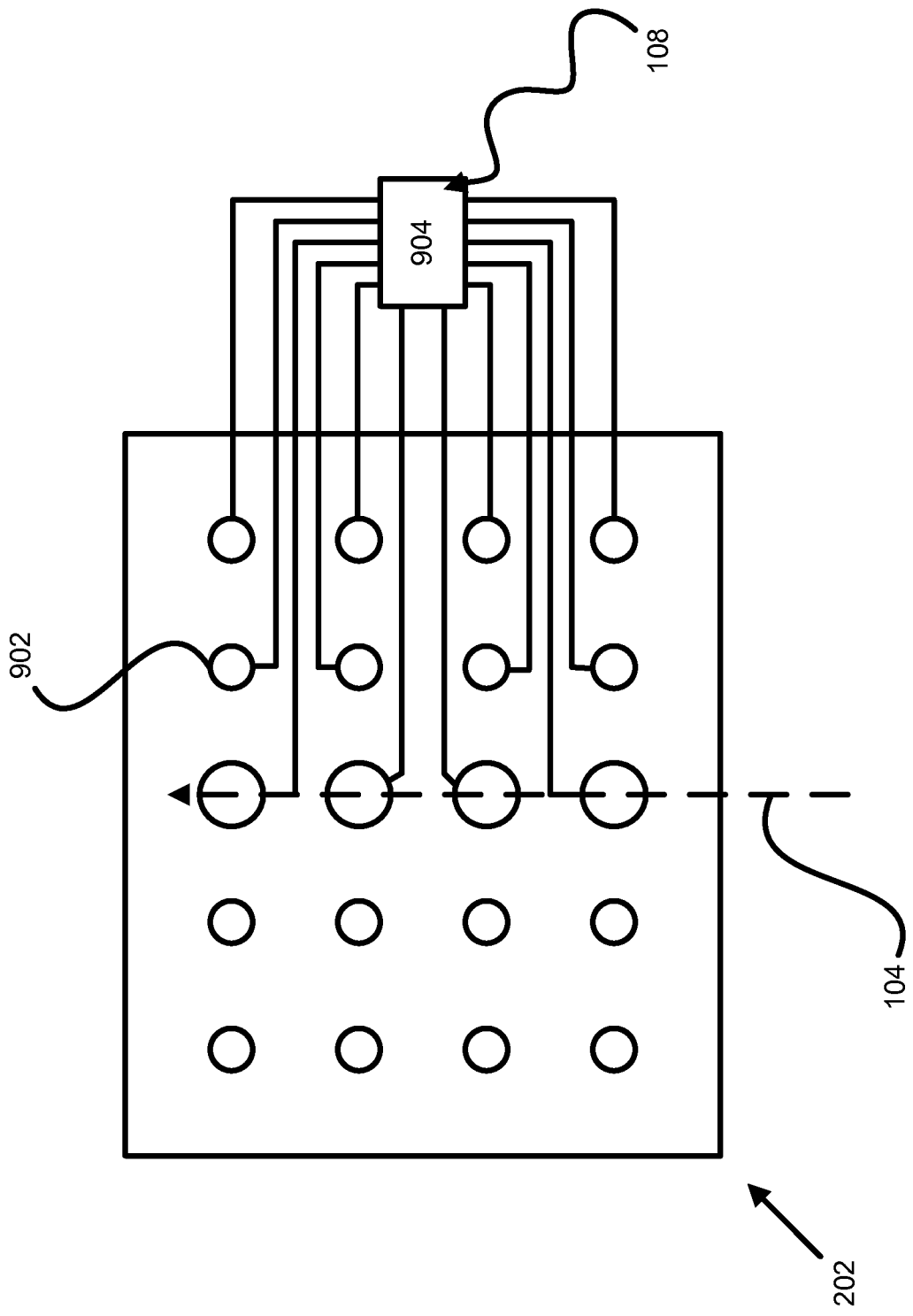
FIG. 9 is an illustration of an apparatus comprising a first photonic crystal structure.

FIG. 9 is an illustration of an embodiment of an apparatus comprising a first photonic crystal structure 202 having a first photonic band gap distribution and configured to support a first electromagnetic signal 204, the first photonic crystal structure including a first mechanically moveable element 902. In this embodiment, a first converter 904 is configured to receive the second electromagnetic signal 208, different from the first electromagnetic signal 204, and output a first electrical signal corresponding to the second electromagnetic signal 208. The first mechanically movable element 902 is responsive to the first electrical signal to change the first photonic band gap distribution. The mechanically movable elements 902 are configured to receive the first electrical signal and move to new locations, thus changing the lattice spacing and the photonic band gap distribution of the first photonic crystal structure 202.

The embodiment of FIG. 9 shows the photonic crystal structure 202 in a first configuration, wherein the relative spacing of the first mechanically moveable elements 902 is configured to change. In some embodiments the photonic crystal structure 202 may have two discrete configurations that it is configured to switch between. In some embodiments the photonic crystal structure 202 may have more than two different configurations and/or a substantially continuous range of configurations. For example, where the mechanically movable elements 902 are configured to move by an amount determined by a property of the second electromagnetic signal (such as amplitude, frequency, or a different property), the photonic band gap distribution may be determined by the property of the second electromagnetic signal.

Although FIG. 9 shows the mechanically moveable element 902 as being connected directly to a lattice point of the photonic crystal structure 202 to move the lattice point, in other embodiments the mechanically moveable element 902 may be connected to the photonic crystal structure 202 to change the photonic band gap distribution in a different way. For example, the mechanically moveable element 902 may be configured to provide strain to the photonic crystal structure 202 to change the photonic band gap distribution as described previously with respect to FIG. 7.

Although FIG. 9 shows only a portion of the mechanically moveable elements 902 as being connected to the first converter 904 for illustrative purposes, all of the mechanically moveable elements 902 may be connected to the first converter. For example, each of the lattice points in a photonic crystal structure 202 may be configured to be mechanically moveable and may be operably connected to a converter such as the first converter 904. Or, in other embodiments, only a portion of the lattice points in a photonic crystal structure 202 may be configured to be mechanically moveable and/or attached to a converter such as 904.

In some embodiments the first electrical signal may be converted to a first magnetic signal, and moving at least a first portion of the first region with the first electrical signal may includes moving at least a first portion of the first region with the first magnetic signal. For example, where portions of the first photonic crystal structure 202 include one or more magnetically responsive materials, the first magnetic signal may be used to move the elements.

Further, one skilled in the art may combine the embodiment of FIG. 9 with other embodiments as described herein. For example, as described with respect to FIG. 4, the photonic crystal structure 202 shown in FIG. 9 may include two different regions. As described with respect to FIG. 6, the first photonic crystal structure 202 shown in FIG. 9 may be part of a larger system. There are many different configurations of the apparatus of FIG. 9 and one skilled in the art may apply embodiments described herein to the embodiment of FIG. 9.

Figure 10:
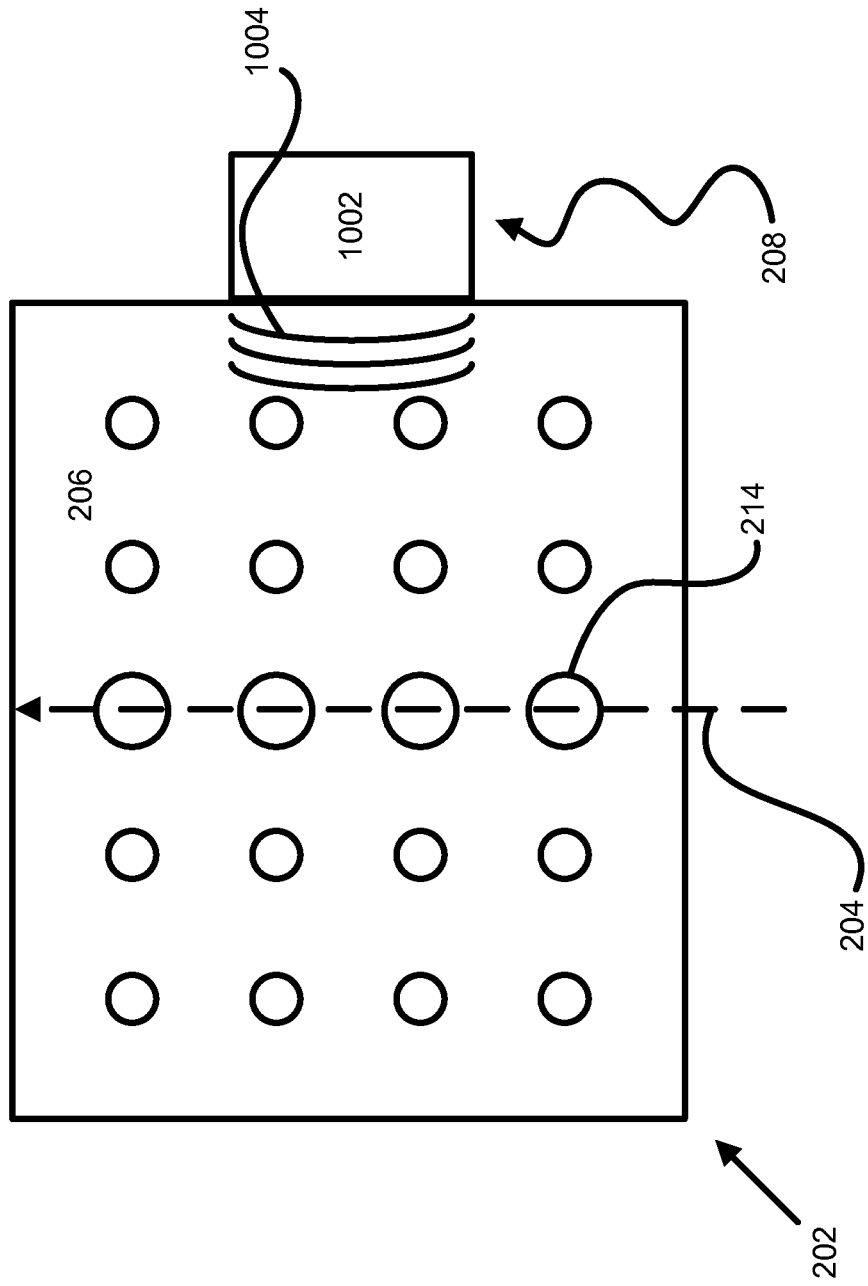
FIG. 10 is an illustration of an apparatus comprising a first photonic crystal structure.

FIG. 10 shows an embodiment of an apparatus comprising a first photonic crystal structure 202 having a first photonic band gap distribution and configured to support a first electromagnetic signal 204, a first converter 1002 configured to receive a second electromagnetic signal 208, different from the first electromagnetic signal 204, and output a first acoustic signal (represented diagrammatically as the wavefronts 1004) corresponding to the second electromagnetic signal 208, and wherein the first photonic band gap distribution is configured to change corresponding to the first acoustic signal 1004. The use of an acoustic wave to modulate the propagation of electromagnetic energy in a photonic crystal is described in U.S. Pat. No. 6,809,856 to Reed et al., which is incorporated herein by reference.

Although the first converter 1002 is shown as having an orientation of substantially ninety degrees from the direction of propagation of the first electromagnetic signal 204, in other embodiments the orientation of the first converter may be at a different angle. Further, although FIG. 10 shows a single converter 1002, other embodiments may include more than one converter. Further, although FIG. 10 shows the first photonic crystal structure 202 as including a substantially 2D photonic crystal, other embodiments may include different photonic crystal structures.

In some embodiments, one or more converters 1002 may be configured to output one or more acoustic waves, where the one or more acoustic waves may be configured to interact. For example, they may be configured to interfere constructively and/or destructively, and the location of the one or more converters and type of acoustic waves (such as frequency, amplitude, or other characteristics) created may be selected according to the desired interference pattern. The one or more converters 1002 may be configured to produce acoustic waves having propagation directions that are substantially orthogonal to one another and/or to the direction of propagation of an electromagnetic wave such as 204 and/or 304, and may be coplanar and/or non-coplanar with each other and/or with the propagation direction of the electromagnetic waves such as 204 and/or 304. In other embodiments, the propagation direction the one or more acoustic waves may not be orthogonal to the direction of propagation of an electromagnetic wave such as 204 and/or 304, but may form a different angle than 90 degrees. Further, although the photonic crystal structure 202 shown in FIG. 10 is substantially two-dimensional, in other embodiments the photonic crystal structure 202 may include a 1D and/or 3D photonic crystal, and in these embodiments the one or more converters 1002 may be placed in any kind of distribution, including a substantially three-dimensional array. In some embodiments, one or more converters 1002 may be configured to produce one or more surface acoustic waves (SAW).

One skilled in the art may combine the embodiment of FIG. 10 with other embodiments as described herein. For example, as described with respect to FIG. 4, the photonic crystal structure 202 shown in FIG. 10 may include two different regions. As described with respect to FIG. 6, the first photonic crystal structure 202 shown in FIG. 10 may be part of a larger system. There are many different configurations of the apparatus of FIG. 10 and one skilled in the art may apply embodiments described herein to the embodiment of FIG. 10.

Figure 11:
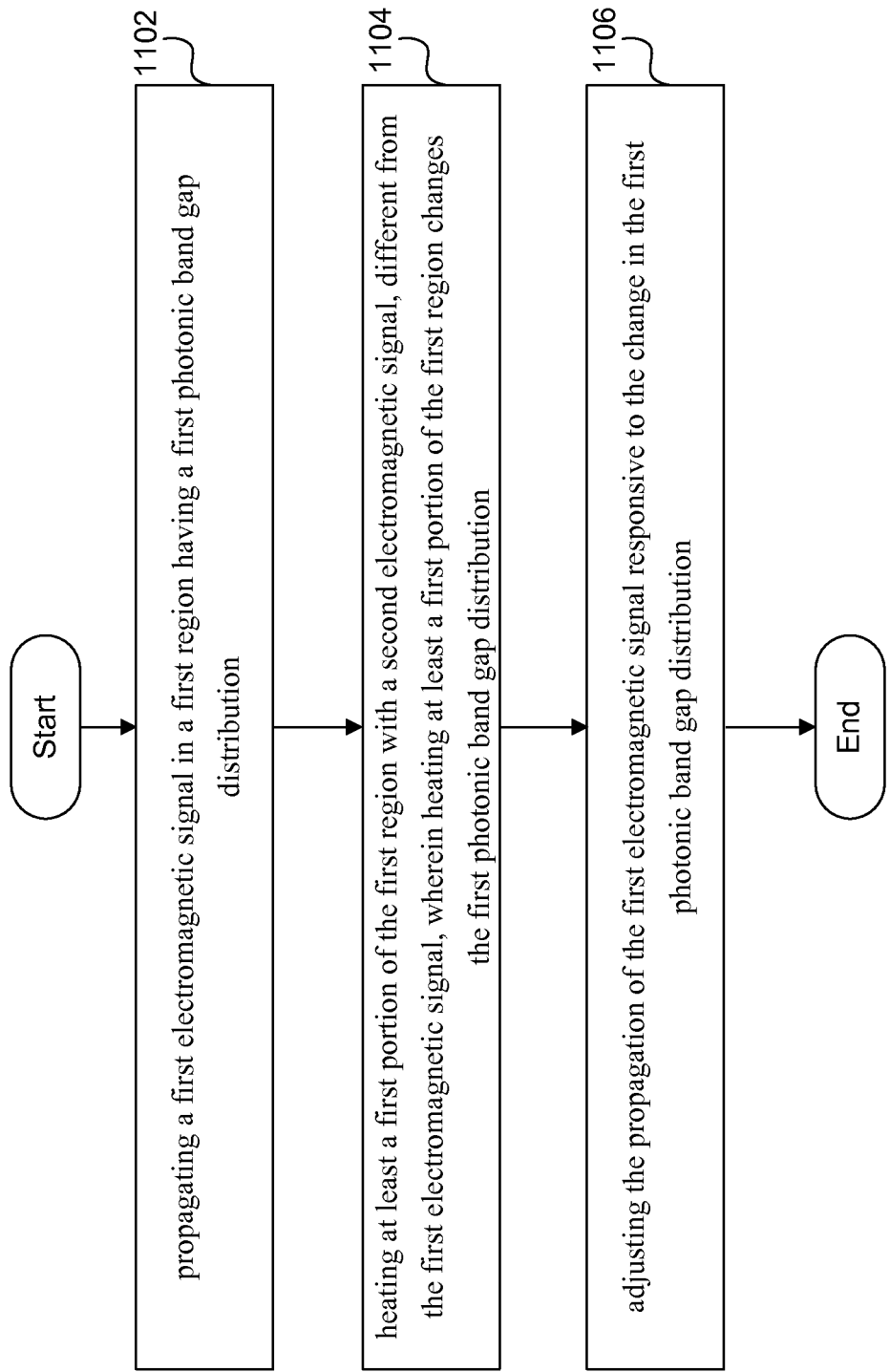
FIGS. 11-13 are each flow charts illustrative of a method.

In one embodiment, depicted in the flow chart of FIG. 11, a method comprises (1102) propagating a first electromagnetic signal in a first region having a first photonic band gap distribution; (1104) heating at least a first portion of the first region with a second electromagnetic signal, different from the first electromagnetic signal, wherein heating at least a first portion of the first region changes the first photonic band gap distribution; and (1106) adjusting the propagation of the first electromagnetic signal responsive to the change in the first photonic band gap distribution.

In one embodiment, (1106) adjusting the propagation of the first electromagnetic signal may include changing the spectral width of the first electromagnetic signal.

The method may further comprise heating at least a second portion of the first region with a third electromagnetic signal, different from the first and second electromagnetic signals, wherein heating at least a second portion of the first region changes the first photonic band gap distribution.

The method may further comprise propagating a third electromagnetic signal in the first region, heating at least a second portion of the first region with a fourth electromagnetic signal, wherein heating at least a second portion of the first region changes the first photonic band gap distribution, and adjusting the propagation of the third electromagnetic signal responsive to the changing the first photonic band gap distribution. In this case, the first electromagnetic signal may have a first frequency distribution and the third electromagnetic signal may have a second frequency distribution different from the first frequency distribution.

In one embodiment, the first electromagnetic signal may have a first frequency distribution and the second electromagnetic signal may have a second frequency distribution different from the first frequency distribution. In this case, the first frequency distribution may have a first center frequency and the second frequency distribution may have a second center frequency different from the first center frequency, wherein the first center frequency may be greater than the second center frequency, or the first center frequency may be less than the second center frequency.

The method may further comprise varying a characteristic of the second electromagnetic signal as a function of time, wherein varying a characteristic of the second electromagnetic signal as a function of time changes the first photonic band gap distribution as a function of time.

Figure 12:
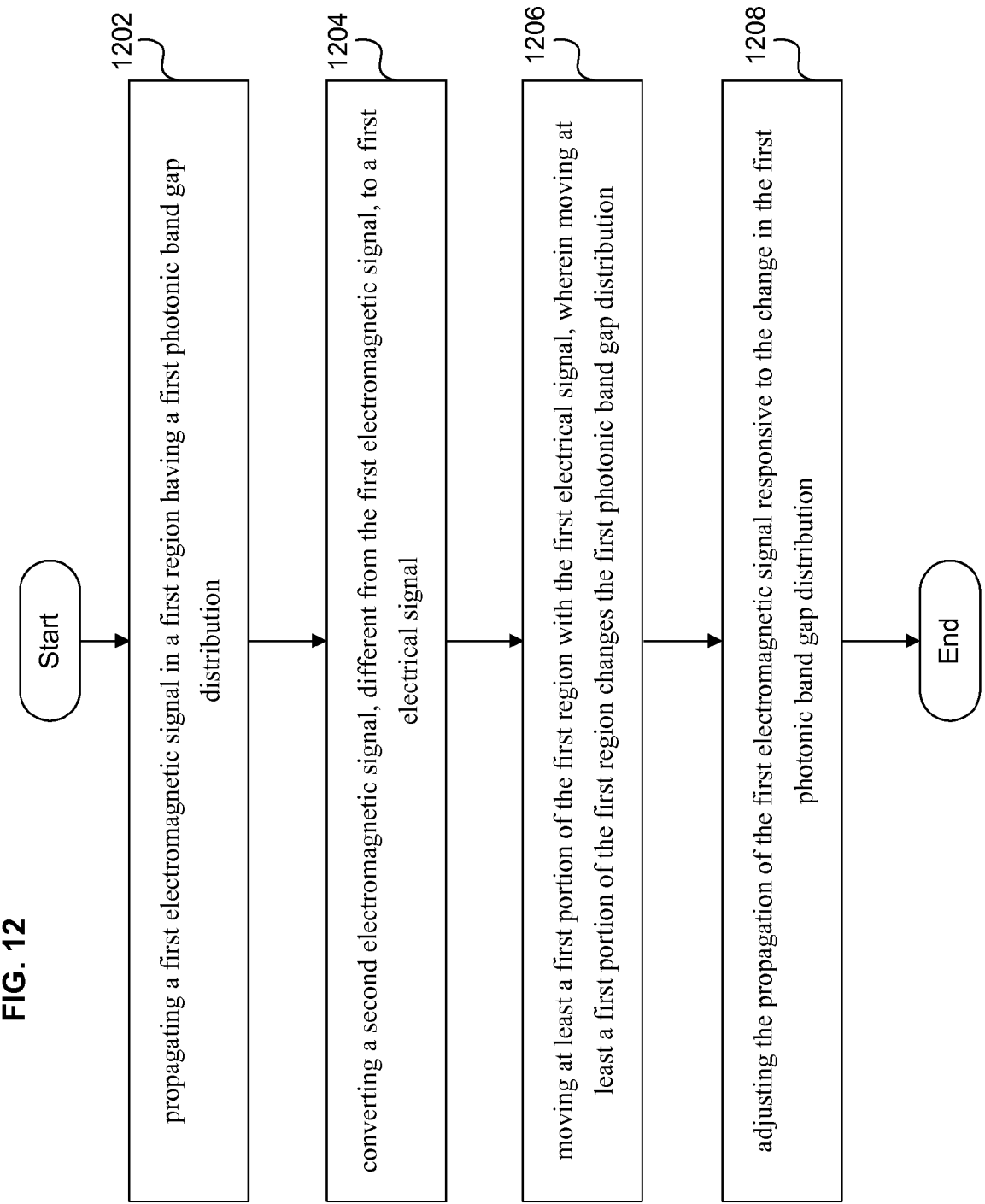

In one embodiment, depicted in the flow chart of FIG. 12, a method comprises (1202) propagating a first electromagnetic signal in a first region having a first photonic band gap distribution, (1204) converting a second electromagnetic signal, different from the first electromagnetic signal, to a first electrical signal, (1206) moving at least a first portion of the first region with the first electrical signal, wherein moving at least a first portion of the first region changes the first photonic band gap distribution, and (1208) adjusting the propagation of the first electromagnetic signal responsive to the change in the first photonic band gap distribution.

In this embodiment, (1208) adjusting the propagation of the first electromagnetic signal may include changing the spectral width of the first electromagnetic signal.

The method may further comprise converting a third electromagnetic signal to a second electrical signal, and moving at least a second portion of the first region with the second electrical signal, wherein moving at least a second portion of the first region changes the first photonic band gap distribution.

The method may further comprise propagating a third electromagnetic signal in the first region, converting a fourth electromagnetic signal to a second electrical signal, moving at least a second portion of the first region with the second electrical signal, wherein moving at least a second portion of the first region changes the first photonic band gap distribution, and adjusting the propagation of the third electromagnetic signal responsive to the changing the first photonic band gap distribution. In this case the first electromagnetic signal may have a first frequency distribution and the third electromagnetic signal may have a second frequency distribution different from the first frequency distribution.

In some embodiments, the first electromagnetic signal may have a first frequency distribution and the second electromagnetic signal may have a second frequency distribution different from the first frequency distribution. In this case, the first frequency distribution may have a first center frequency and the second frequency distribution may have a second center frequency different from the first center frequency. In some embodiments the first center frequency may be greater than the second center frequency. In some embodiments, the first center frequency may be less than the second center frequency.

In some embodiments the method may further comprise varying a characteristic of the second electromagnetic signal as a function of time, wherein varying the intensity of the second electromagnetic signal as a function of time changes the first photonic band gap distribution as a function of time.

Figure 13:
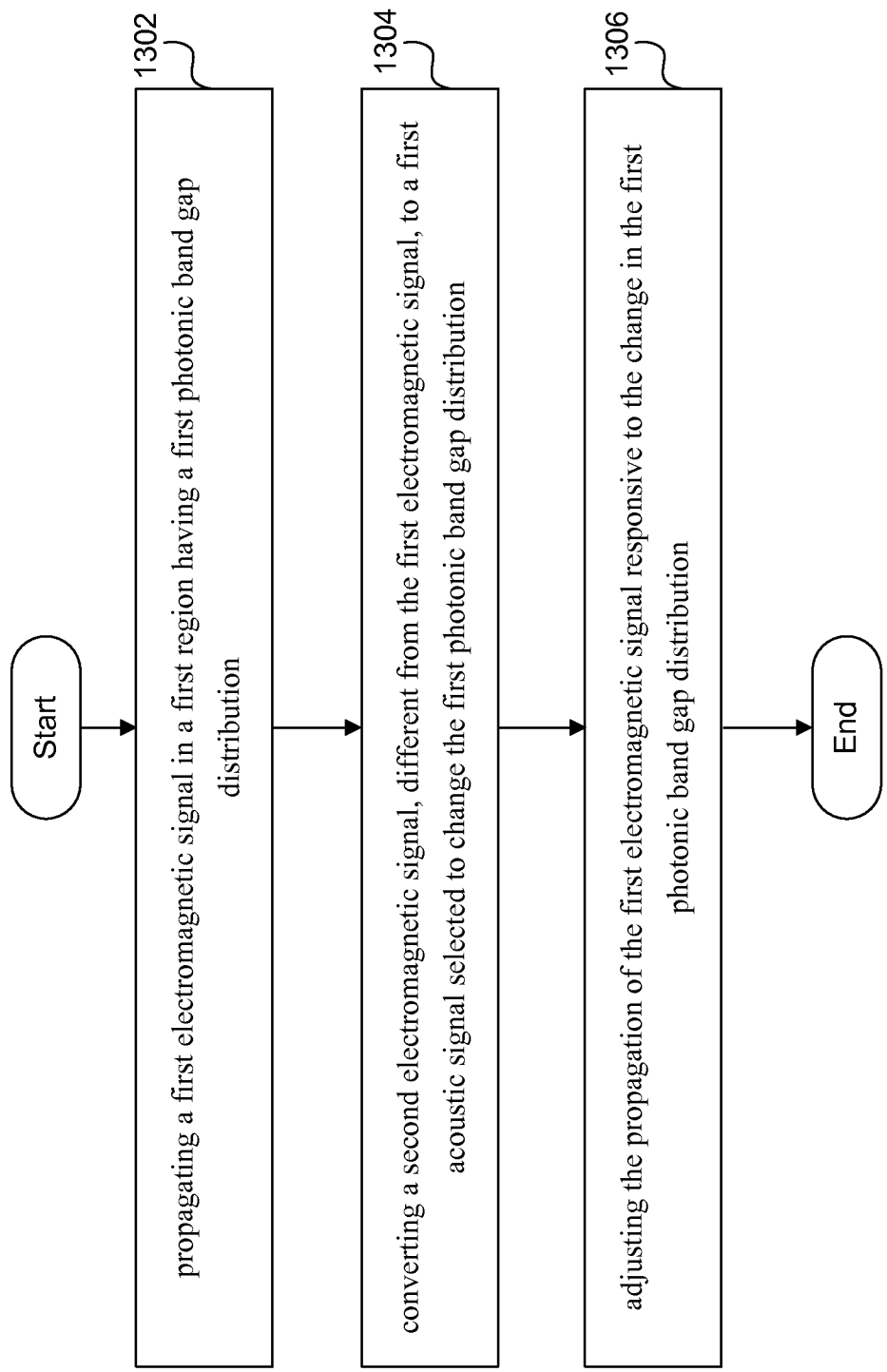

In one embodiment, depicted in the flow chart of FIG. 13, a method comprises (1302) propagating a first electromagnetic signal in a first region having a first photonic band gap distribution, (1304) converting a second electromagnetic signal, different from the first electromagnetic signal, to a first acoustic signal selected to change the first photonic band gap distribution, and (1306) adjusting the propagation of the first electromagnetic signal responsive to the change in the first photonic band gap distribution.

In this embodiment, (1306) adjusting the propagation of the first electromagnetic signal may include changing the spectral width of the first electromagnetic signal.

The method may further comprise converting a third electromagnetic signal, different from the first and second electromagnetic signals, to a second acoustic signal selected to change the first photonic band gap distribution.

The method may further comprise propagating a third electromagnetic signal in the first region, converting a fourth electromagnetic signal to a second acoustic signal selected to change the first photonic band gap distribution, and adjusting the propagation of the third electromagnetic signal responsive to the changing the first photonic band gap distribution. In this case the first electromagnetic signal may have a first frequency distribution and the third electromagnetic signal may have a second frequency distribution different from the first frequency distribution.

In some embodiments the first electromagnetic signal may have a first frequency distribution and the second electromagnetic signal may have a second frequency distribution different from the first frequency distribution. In this case the first frequency distribution may have a first center frequency and the second frequency distribution may have a second center frequency different from the first center frequency, wherein the first center frequency may be greater than or less than the second center frequency.

The method may further comprise varying a characteristic of the second electromagnetic signal as a function of time, wherein varying a characteristic of the second electromagnetic signal as a function of time changes the first photonic band gap distribution as a function of time.

In some embodiments media may be employed to perform one or more of the methods as described above and/or methods for operating the apparatus as described previously. For example, in some embodiments, circuitry and/or software may be configured to perform these methods, and may be programmed in such a way as to provide instructions to one or more devices to carry out the steps of the methods as described above.

Although different embodiments have been described substantially separately (e.g. thermal, mechanical, acoustic), some embodiments may employ two or more of the embodiments that are described separately herein. For example, the thermal methods as described with respect to FIGS. 2 and 3 may be employed in the same photonic crystal structure as the mechanical methods as described in FIG. 9 and/or the acoustic method as described in FIG. 10.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory.

Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although user is shown/described herein as a single illustrated figure, those skilled in the art will appreciate that user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus comprising:
a first photonic crystal structure having a first photonic band gap distribution and configured to support a first electromagnetic signal having a first frequency distribution, the first photonic crystal structure including a first mechanically movable element;

a first converter configured to receive a second electromagnetic signal different from the first electromagnetic signal and having a second frequency distribution that does not overlap the first frequency distribution, wherein the first converter is further configured to output a first electrical signal corresponding to the second electromagnetic signal; and wherein the first mechanically movable element is responsive to the first electrical signal to change the first photonic band gap distribution.

2. The apparatus of claim 1 wherein the first photonic band gap distribution includes a photonic band gap in at least three dimensions.

3. The apparatus of claim 1 wherein the first photonic crystal structure includes a first material and a second material different from the first material, the first and second materials each having a real dielectric constant greater than 1.

4. The apparatus of claim 1 wherein the first mechanically movable element is responsive to the first electrical signal to reversibly change the first photonic band gap distribution.

5. The apparatus of claim 1 wherein the first mechanically movable element is responsive to the first electrical signal to irreversibly change the first photonic band gap distribution.

6. The apparatus of claim 1 wherein the first photonic crystal structure includes a first material having the first photonic band gap distribution, and wherein the first mechanically movable element is integral to the first material.

7. The apparatus of claim 1 wherein the first photonic crystal structure includes a first material having the first photonic band gap distribution, and wherein the first mechanically movable element is arranged proximate to the first material having the first photonic band gap distribution.

8. The apparatus of claim 1 further comprising a sensor configured to detect at least one property of the first electromagnetic signal, wherein the sensor is operably coupled to a device configured to control the second electromagnetic signal.

9. The apparatus of claim 8 wherein the device configured to control the second electromagnetic signal includes an electromagnetic energy generator configured to produce the second electromagnetic signal.

10. The apparatus of claim 8 wherein the device configured to control the second electromagnetic signal includes an optical element configured to interact with the second electromagnetic signal.

11. The apparatus of claim 1 wherein the first photonic crystal structure is configured to support a first electromagnetic signal having a first polarization that is variable according to the varying photonic band gap distribution.

12. The apparatus of claim 1 wherein the first photonic crystal structure is configured to support a first electromagnetic signal corresponding to a first mode, the first mode having a first amplitude that is variable according to the varying photonic band gap distribution.

13. The apparatus of claim 1 wherein the first photonic crystal structure is configured to output at least a portion of the first electromagnetic signal, and wherein the outputted portion of the first electromagnetic signal forms at least a portion of the second electromagnetic signal.

14. An apparatus comprising:
a first photonic crystal structure having a first photonic band gap distribution and configured to support a first electromagnetic signal having a first frequency distribution;
a first converter configured to receive a second electromagnetic signal, different from the first electromagnetic signal and having a second frequency distribution that does not overlap the first frequency distribution, wherein the first converter is further configured to output a first acoustic signal corresponding to the second electromagnetic signal; and
wherein the first photonic band gap distribution is configured to change corresponding to the first acoustic signal.

15. The apparatus of claim 14 further comprising a sensor configured to detect at least one property of the first electromagnetic signal, wherein the sensor is operably coupled to a device configured to control the second electromagnetic signal.

16. The apparatus of claim 15 wherein the sensor is operably coupled to circuitry, and wherein the circuitry is operably coupled to the device configured to control the second electromagnetic signal.

17. The apparatus of claim 14 wherein the first photonic band gap distribution is configured to vary between a first state and a second state, wherein the first state corresponds to a first configuration of the second electromagnetic signal and the second state corresponds to a second configuration of the second electromagnetic signal.

18. The apparatus of claim 14 wherein the first photonic crystal structure is configured to output at least a portion of the first electromagnetic signal, and wherein the outputted portion of the first electromagnetic signal forms at least a portion of the second electromagnetic signal.

19. A method comprising:
propagating a first electromagnetic signal having a first frequency distribution in a first region having a first photonic band gap distribution;
converting a second electromagnetic signal, different from the first electromagnetic signal and having a second frequency distribution that does not overlap the first frequency distribution, to a first acoustic signal selected to change the first photonic band gap distribution; and
adjusting the propagation of the first electromagnetic signal responsive to the change in the first photonic band gap distribution.

20. The method of claim 19 further comprising:
varying a characteristic of the second electromagnetic signal as a function of time, wherein varying a characteristic of the second electromagnetic signal as a function of time changes the first photonic band gap distribution as a function of time.

* * * * *